Figure 1:
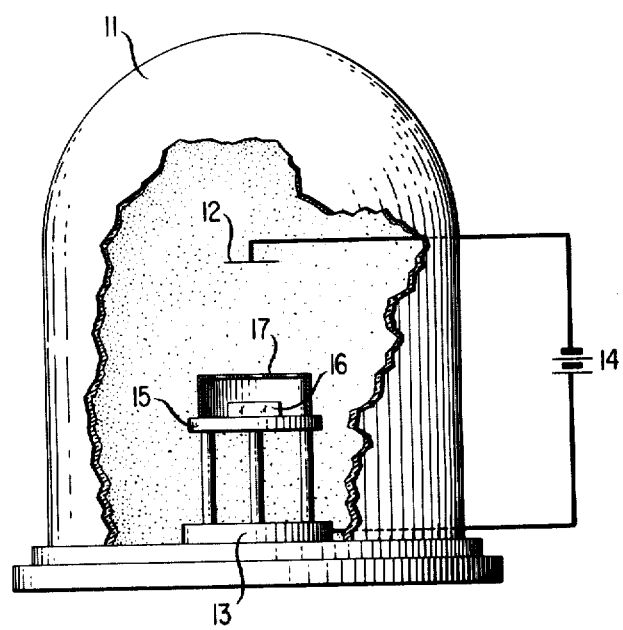
Figure 1:
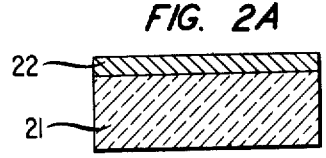
Figure 1:
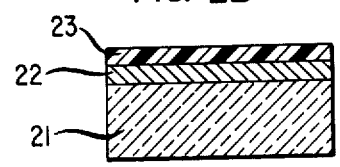
Figure 1:
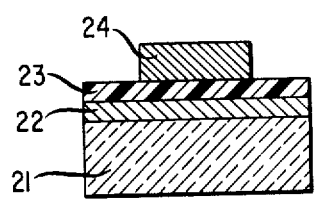
Figure 1:
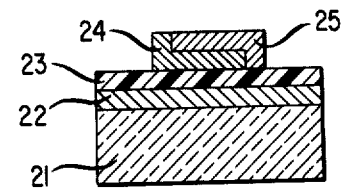
Figure 1:
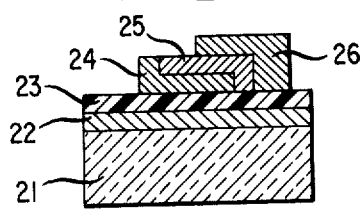

United States Patent [19]

Feit et al.

[11] 4,036,708

[45] July 19, 1977

[54] TECHNIQUE FOR NUCLEATING B.C.C. TANTALUM FILMS ON INSULATING SUBSTRATES

[75] Inventors: Eugene David Feit, Berkeley Heights; Newton Schwartz, Morristown, both of N.J.

[73] Assignee: Bell Telephone Laboratories, Incorporated, Murray Hill, N.J.

[21] Appl. No.: 686,118

[22] Filed: May 13, 1976

[51] Int. Cl.² .................. C25D 11/26; H01G 13/00
[52] U.S. Cl. ........................ 204/38 A; 204/192 F; 361/304; 361/322
[58] Field of Search ........ 204/38 A, 192 FR, 192 ID; 361/304, 322

[56] References Cited

U.S. PATENT DOCUMENTS

| | | | |
|---|---|---|---|
| 3,258,413 | 6/1966 | Pendergast | 204/192 |
| 3,723,838 | 3/1973 | Kumagai | 204/192 SP X |
| 3,808,109 | 4/1974 | Schauer | 204/38 A |
| 3,878,079 | 4/1975 | Schauer | 204/192 FR |

OTHER PUBLICATIONS

W. D. Westwood et al., Thin Solid Films, pp. 407–420, 5, No. 5/6, (1970).

Primary Examiner—G. L. Kaplan
Attorney, Agent, or Firm—Edward M. Fink

[57] ABSTRACT

A technique is described for depositing organic layers down to a fraction of a monolayer thickness upon insulating substrates by non-vacuum deposition techniques which permit the subsequent deposition of mechanically stable adherent films of b.c.c. tantalum of low resistivity. The deposited films permit the fabrication of low cost, high frequency performance tantalum thin film capacitors.

9 Claims, 6 Drawing Figures

U.S. Patent     July 19, 1977     4,036,708

TECHNIQUE FOR NUCLEATING B.C.C. TANTALUM FILMS ON INSULATING SUBSTRATES

This invention relates to a technique for the growth of b.c.c. tantalum films. More particularly, the present invention relates to a technique for the nucleation of b.c.c. tantalum films of low resistivity.

During the years in which tantalum thin film circuitry was gaining in prominence, considerable interest was focused upon the suitability of α-tantalum (the well known b.c.c. tantalum) and β-tantalum for thin film applications. Early studies revealed that the β-tantalum crystallographic form was superior for such purposes, the α-tantalum films evidencing mechanical instability, softness, and crazing. Thus, the industry turned to β-tantalum to meet the increasing demands of thin film integrated circuitry. Nonetheless, with the passage of time, continued studies revealed that β-tantalum was also susceptible to crazing under certain deposition conditions.

Recent investigations have shown that low level impurities present in the vacuum deposition apparatus are capable of nucleating the formation of low resistivity α-tantalum films which are mechanically stable and evidence outstanding characteristics for capacitor applications. The use of such low resistivity films permits higher frequency performance for a given film thickness and alternatively, for a given frequency range the tantalum film employed may be thinner, so permitting cost reduction in the sputtering operation.

In accordance with the present invention, a non-vacuum technique is described for the preparation of low resistivity α-tantalum films upon a nonconducting substrate. Briefly, the inventive technique involves coating organic films upon the substrate of interest by conventional coating techniques and, subsequently, depositing a thin film of tantalum thereon by condensation techniques.

The invention will be more readily understood by reference to the following detailed description taken in conjunction with the accompanying drawing wherein:

FIG. 1 is a front elevational view of an apparatus suitable for use in preparing a film of tantalum by cathodic sputtering, a typical procedure suitable for use in the practice of the present invention and FIG. 2A–2E are front elevational views in cross-section of a capacitor prepared in accordance with the present invention in successive stages of fabrication.

With reference now more particularly to the drawing, FIG. 1 shows a typical apparatus suitable for depositing tantalum films in accordance with the present invention. The apparatus shown is a cathodic sputtering chamber 11 having disposed therein cathode 12 and anode 13. Cathode 12 may be comprised of tantalum or, alternatively, may serve as the base for a tantalum foil or coating. A source of electrical potential 14 is shown connected between cathode 12 and anode 13. Platform 15 is employed as a positioning support for substrate 16 upon which a sputtered film is to be deposited. Mask 17 is placed on substrate 16 to restrict deposition to the desired area.

FIG. 2A–2E are front elevational views in cross-section of a capacitor prepared in accordance with the present invention. Shown in FIG. 2A is a nonconducting substrate 21 which may optionally include a layer of tantalum pentoxide 22 of at least ten nm thickness. The first step in the practice of the present invention involves coating a layer of organic material 23 down to a fraction of a monolayer (FIG. 2B) upon substrate 21. This end is effected by either (a) dipping the substrate into a pure organic liquid and permitting the excess to run off by contact with the wall of a glass beaker, (b) dipping the substrate into a dilute solution of the organic material in a volatile solvent and permitting the solvent to evaporate, (c) rubbing a thin layer of a high molecular weight polymer directly on the surface of the substrate, or (d) spraying the substrate with a dilute solution of the organic material or the organic material itself.

Studies have revealed that organic compounds suitable for use in the practice of the present invention evidence a vapor pressure less than 90 torr at 190° C. Typical organic species meeting this requirement include high molecular compounds ranging from hexadecane ($C_{16}H_{34}$) to high molecular weight polyethylene ($2 \times 10^{-6}$ g/g mol. wt). Compositions found particularly suitable for this purpose are hexadecane, tetracosane, melamine-formaldehyde condensation products, a terpolymer of vinyl chloride, vinyl acetate and maleic acid, polytetrafluoroethylene, polyethylene and the like. However, it has also been found that the use of lower temperatures of the order of 35° C will in some instances permit the use of compounds found unacceptable at the elevated temperatures. Thus, dodecane and thiourea have been found suitable at the lower temperatures.

Next, the structure shown in FIG. 2B is inserted in a condensation apparatus, as for example, a sputtering chamber of the type shown in FIG. 1, and a layer of tantalum 24 deposited thereon (FIG. 2C). Then tantalum layer 24 is next immersed in a typical anodizing electrolyte and made positive with respect to another electrode immersed in the electrolyte. Anodization is continued for the purpose of producing oxide film 25 shown in FIG. 2D. The last step in the process involves depositing a counterelectrode 26 upon the anodized oxide film 25. This is conveniently accomplished by vacuum evaporation or any well known procedure which neither disturbs or modifies the thermal and mechanical properties of the oxide layer.

To obtain the best quality of metal deposit, it is preferred that the substrate be possessed of a smooth surface which is completely free from sharp changes in contour and is able to withstand temperatures ranging up to 400° C. All types of refractory materials such as glass, ceramics and high melting metals meet this requirement.

The present invention is conveniently described in detail by reference to an illustrative example in which b.c.c. tantalum is deposited by cathodic sputtering in an apparatus similar to that shown in FIG. 1.

Substrate 16 is first subjected to a cleaning procedure. Conventional cleaning agents are suitable for this purpose, the choice of a particular agent being dependent upon the composition of the substrate itself. The substrate, which as indicated above, may include a tantalum oxide protective coating having a thickness of the order of 10 nm. Following, the cleaned substrate has deposited thereon an organic nucleating agent, with thicknesses down to a fraction of a monolayer. The most convenient procedure for effecting this end involves dipping the substrate into a pure organic liquid and permitting the excess to run off. Alternatively, the substrate may be dipped in or sprayed with a dilute solution of the organic material in a solvent and permitting the solvent to evaporate. Solvents suitable for this purpose are methanol, acetone, carbon disulfide, benzene, toluene, etc. Lastly, the organic layer may be deposited by rubbing a thin layer of a polymer directly on the substrate surface. Suitable materials for this purpose are polyethylene and polytetrafluoroethylene.

Next, the coated substrate is placed in an apparatus of the type shown in FIG. 1 and cathodic sputtering effected. The conditions used in cathodic sputtering as employed herein are known (see "Vacuum Deposition of Thin Films", L. Holland, J. Wylie and Sons, Incorporated, New York 1956). In accordance with this process, the vacuum chamber is first evacuated and flushed with an inert gas, as for example, any of the members of the rare gas family such as helium, argon or neon, and the chamber re-evacuated. The extent of the vacuum is dictated at the upper level by power supply limitations, typically 10–20 torr (1.3 × $10^3$ to 2.6 × $10^3$ Pa) for a sputtering voltage of the order of 5000 volts. The minimum pressure is determined by the lowest deposition rate which can be economically tolerated.

After the requisite pressure is attained, the cathode, which may either be tantalum or alternatively, covered with tantalum in the form of a foil, is made electrically negative with respect to the anode. The minimum voltage necessary to produce a sputtered layer of tantalum suitable for use herein is about 4000 volts. The spacing between anode and cathode is not critical and need only be sufficient to produce a glow discharge.

The balancing of the various factors of voltage, pressure, and relative positions of the cathode, anode, and substrate to obtain a high quality deposit is well known in the sputtering art.

With reference now more particularly to the example under discussion, by employing a proper voltage, pressure and spacing of the various elements within the vacuum chamber, a layer of α tantalum is deposited in a configuration determined by mask 17. The sputtering is conducted for a period of time calculated to produce the desired thickness, typically within the range of 500 to 10,000 Angstroms (50 to 1,000 nm).

Following sputtering, the tantalum layer is anodized in an appropriate electrolyte. The voltage at which the anodizing is conducted is primarily determined by the voltage at which the capacitors are to be operated. The usual procedure followed is similar to conventional anodizing procedures in which a low voltage is applied initially and the voltage then increased so as to maintain a constant anodizing current. Typical electrolytes suitable for this purpose are oxalic acid, citric acid, tartaric acid and the like.

The last step in the fabrication of a capacitor in accordance with this invention is the application of a counter-electrode in contact with the oxide film. Any suitable method for producing an electrically conductive layer on the surface of the oxide layer is suitable, provided such method does not mechanically or thermally disturb the oxide layer. Vacuum evaporation is particularly well suited for producing counterelectrodes in accordance with the invention, metals such as aluminum, gold or combinations such as chromium-gold, being conveniently used for this purpose.

Several examples of the present invention are described in detail below. These examples are included merely to aid in the understanding of the invention, and variations may be made by one skilled in the art without departing from the spirit and scope of the invention.

EXAMPLE I

A glass microscope slide having a thin layer of tantalum oxide thereon was used as the substrate. The slide was sequentially cleaned with boiling trichloroethylene; an ultrasonic detergent wash; a 10-minute overflow rinse with deionized water; an oxidative treatment for ten minutes in 500 cc of water, 200 cc of 30% hydrogen peroxide and ten cc of concentrated ammonium hydroxide at a temperature ranging from 80°–90° C; a 10-minute overflow rinse in deionized water; a vapor drying treatment in boiling ethanol; a nitrogen stream dry; and a bake in air at 500°–550° C for 30 minutes.

One half of the slide so cleaned was next dipped into pure liquid hexadecane ($C_{16}H_{34}$) and the excess permitted to run off by contact with the wall of a glass beaker. Following, the slide was placed in a vacuum station and the system evacuated for four hours until a pressure of about 1 × $10^{-7}$ torr (1.33 × $10^{-5}$ Pa) was attained, and when throttled was about 3 × $10^{-7}$ torr (4.0 × $10^{-5}$ Pa). Argon was then introduced to the system until a pressure of about 1.0 × $10^{-2}$ torr (1.33 Pa) was reached. Then, with a shutter in place between a 6 × 6 inch tantalum cathode of 99.99 purity and an anode supporting the slide (cathode to anode distance of 2.75 inches) a glow discharge was initiated at 5kV and 35 ma. During the presputtering period of 45 minutes the substrate temperature rose due to election and negative ion bombardment to a value between 185° and 200° C. Then, the shutter was removed and tantalum deposited on the slide for 45 minutes, so yielding films approximately 450 mm thick.

After deposition, the cooled slides were removed from the vacuum station and x-ray structure and resistivity determined. A resistivity in the range of 35–60 micro-ohm-cm indicated that α-tantalum was formed whereas a resistivity ranging from 190–210 indicated formation of β-tantalum. Resistivities between 60 and 190 micro-ohm-cm indicated a mixture of both the α and β phases. The resistivity of the dipped half of the slide was 91 micro-ohm-cm and 200 micro-ohm-cm on the undipped side.

EXAMPLE II

The procedure of Example I was repeated with the exception that solutions or rubbing with the organic compound were used as the means for applying the organic layer. The results are set forth in Table I.

TABLE I

| Example | Organic Compound | Form | Solvent | Concentration | Resistivity micro-ohm-cm Dipped | Resistivity micro-ohm-cm Undipped |
|---|---|---|---|---|---|---|
| 1 | Hexadecane $C_{16}H34$ | Pure liquid | — | — | 91 | 200 |
| 2 | Tetracosane $C_{24}H50$ | Solution | Pentane | 3mg/cc | 39 | 200 |
| 3 | Melamine-Formaldehyde Polymer | Solution | Water | 3mg/cc | 54 | 200 |

TABLE I-continued

| Example | Organic Compound | Form | Solvent | Concentration | Resistivity micro-ohm-cm | |
|---|---|---|---|---|---|---|
| | | | | | Dipped | Undipped |
| 4 | Terpolymer of Vinyl Chloride, Vinyl Acetate and Maleic Acid | Solution | Acetone | 1.5mg/cc | 40 | 200 |
| 5 | Polytetrafluoro-ethylene | Rub | — | — | 39 | 200 |
| 6 | Polyethylene ($2 \times 10^6$ mol wt) | Rub | — | — | 54 | 200 |

Studies have also revealed that if the presputtering period is 90 seconds and a surface temperature of 35° C attained, then a 45-minute sputtering period will be capable of producing α-tantalum with dodecane and thiourea as evidenced by the data in Table II.

TABLE II

| Example | Organic Compound | Form | Solvent | Concentration | Resistivity micro-ohm-cm | |
|---|---|---|---|---|---|---|
| | | | | | Dipped | Undipped |
| 7 | $C_{12}H26$ | Liquid | | | 74–126 | 200 |
| 8 | Thiourea | Solution | Acetone | 3mg/cc | 54–150 | 200 |

What is claimed is:

1. In the method of making a capacitor which comprises the steps of producing a layer of tantalum on a non-conducting substrate, electrolytically anodizing a portion of the tantalum layer, and applying an electrically conductive film to the anodized portion, the improvement which comprises depositing an organic compound having a vapor pressure less than 90 torr at 190° C with a thickness of a monolayer upon said substrate prior to deposition of the tantalum layer.

2. Method in accordance with claim 1 wherein said organic compound is hexadecane.

3. Method in accordance with claim 1 wherein said organic compound is polyethylene.

4. Method in accordance with claim 1 wherein said organic compound is a terpolymer of vinyl chloride, vinyl acetate and maleic acid.

5. Method in accordance with claim 1 wherein said organic compound is polytetrafluoroethylene.

6. Method in accordance with claim 1 wherein the organic compound is deposited by dipping the substrate in a pure organic liquid.

7. Method in accordance with claim 1 wherein the organic compound is deposited by dipping the substrate in a dilute solution of the organic material in a volatile solvent and the solvent permitted to evaporate.

8. Method in accordance with claim 1 wherein the organic compound is sprayed on the substrate as a dilute solution of the organic material in a volatile solvent and the solvent permitted to evaporate.

9. Method in accordance with claim 1 wherein the organic compound is deposited by rubbing the substrate with the organic material.

* * * * *